United States Patent [19]

Okugawa

[11] 4,437,996

[45] Mar. 20, 1984

[54] PROCESS FOR TREATING CYANIC LIQUID CONTAINING COPPER(I) CYANIDE COMPLEX ION

[75] Inventor: Michihide Okugawa, Nishinomiya, Japan

[73] Assignee: Dainichi-Nippon Cables, Ltd., Hyogo, Japan

[21] Appl. No.: 442,915

[22] Filed: Nov. 19, 1982

[30] Foreign Application Priority Data

Nov. 27, 1981 [JP] Japan .................... 56-191318

[51] Int. Cl.$^3$ .............................................. C02F 1/58
[52] U.S. Cl. ..................................... 210/718; 210/737; 210/904; 210/912
[58] Field of Search ............... 210/904, 912, 719, 721, 210/737, 718

[56] References Cited

U.S. PATENT DOCUMENTS 4,070,281  1/1978  Tagashira et al. ............. 210/904 X
4,071,448  1/1978  Watanabe et al. ............. 210/904 X

FOREIGN PATENT DOCUMENTS 51-50283  5/1976  Japan ................................ 210/904

Primary Examiner—Thomas G. Wyse
Attorney, Agent, or Firm—Birch, Stewart, Kolasch & Birch

[57] ABSTRACT

This invention relates to an improved process for treating a cyanic liquid containing copper(I) cyanide complex ion which comprises heating the liquid at a temperature of not lower than 200° C. in the presence of a water-soluble metal hydroxide, whereby the decomposition of the CN group of copper(I) cyanide complex ion is accomplished in a high rate in a single batch producing a relatively small amount of sludge even when the liquid has a high CN concentration.

9 Claims, No Drawings

PROCESS FOR TREATING CYANIC LIQUID CONTAINING COPPER(I) CYANIDE COMPLEX ION

BACKGROUND OF THE INVENTION

This invention relates to a process for treating a cyanic liquid containing copper(I) cyanide complex ion.

When industrial effluents containing copper(I) cyanide complex ion are discharged, CN groups of copper(I) cyanide complex ion should be thoroughly decomposed prior to the discharge for prevention of environmental pollution. Hitherto, the CN group of copper(I) cyanide complex ion has been generally decomposed by a so-called alkali-chlorine process. This conventional process comprises adding sodium hypochlorite in an amount corresponding to the concentration of the copper(I) cyanide complex ion to the liquid to be treated while maintaining the pH of the liquid at a certain range during the treatment and decomposing the CN groups into carbon dioxide and nitrogen. This process is usually adopted in the treatment of a cyanic liquid containing a CN concentration of 2,000 ppm or less, especially under 1,000 ppm. When the cyanic liquid has a high CN concentration such as 10,000 ppm or higher, the treatment time is much longer and the amount of sodium hypochlorite is enormous so that it is practically impossible to thoroughly decompose the CN groups of copper(I) cyanide complex in a single batch. For treatment of the cyanic liquid having a high CN concentration such as 10,000 ppm or higher by the above conventional process attaining a decomposition rate of 90% or more requires diluting the cyanic liquid to 2,000 ppm or less and then subjecting the diluted liquid to treatment in several batches. These operations naturally make the working less efficient.

In order to overcome the difficulties of the conventional process, there has been proposed an improved process which comprises adding an aqueous solution of at least one ferrous salt selected from the group consisting of ferrous sulfate, ferrous chloride, ferrous nitrate, ferrous acetate, ammonium ferrous sulfate and ferrous iodide to a cyanic liquid containing a copper(I) cyanide complex ion and heating the liquid to 130° C. or higher (cf. Japanese Patent Publication No. 20036/1982). By the improved process, the cyanic liquid having a CN concentration of from several ppm to 100,000 ppm can be effectively treated in a single batch without dilution of the liquid. Since, however, the above improved process requires a ferrous salt for decomposition of the CN groups of copper(I) cyanide complex ion, a sludge containing copper and iron is formed in the treated liquid, and the increased amount of the sludge tends to accumulate in a discharge pipe and makes the separation of the sludge from the liquid troublesome. It is particularly disadvantageous that the recovery of copper becomes difficult, because the sludge contains iron in addition to copper.

SUMMARY OF THE INVENTION

A main object of this invention is to provide a process for treating a cyanic liquid containing copper(I) cyanide complex ion efficiently by decomposing CN groups of copper(I) cyanide complex ion in a high decomposition rate. Another object of the invention is to provide a process for treating a cyanic liquid containing copper(I) cyanide complex ion which produces only a small amount of sludge. These and other objects are fulfilled by heating the cyanic liquid at a temperature of not lower 200° C. in the presence of a water-soluble metal hydroxide.

DETAILED DESCRIPTION OF THE INVENTION

The cyanic liquid containing copper(I) cyanide complex ion to be treated by the process of the invention includes waste copper cyanide plating solutions comprising predominantly copper(I) cyanide complex ion, waste cyanide solutions for extraction of gold, silver, nickel, etc. from a copper article plated with said metals comprising alkali cyanides (e.g. sodium cyanide, potassium cyanide), etc. Namely, according to the invention, any waste liquid containing copper(I) cyanide complex ion such as dicyanocopper ion ($Cu(CN)_2^-$), tricyanocopper ion ($Cu(CN)_3^{--}$) and tetracyanocopper ion ($Cu(CN)_4^{---}$) is treatable.

The CN concentration of the copper(I) cyanide complex ion in the liquid to be treated may be usually from several to 100,000 ppm, preferably from 100 to 80,000 ppm. The liquid having such a high CN concentration can be treated as such, i.e. without dilution, according to the process of the invention.

Specific examples of the water-soluble metal hydroxide are alkali metal hydroxides (e.g. lithium hydroxide, sodium hydroxide, potassium hydroxide), alkaline earth metal hydroxides (e.g. barium hydroxide, calcium hydroxide, strontium hydroxide), etc. Among them, sodium hydroxide and potassium hydroxide are preferred. The presence of these metal hydroxides in the cyanic liquid is effective in efficient decomposition of the CN groups of copper(I) cyanide complex ion. The amount of the metal hydroxide may be at least 0.2 mole, preferably at least 1 mole to 1 mole of the copper(I) cyanide complex ion. The metal hydroxide, which is in the form of solid or of aqueous solution, may be added to the liquid all at once before the treatment or portionwise during the treatment.

The cyanic liquid is heated at a temperature of not lower than 200° C. When the temperature is lower than 200° C., the CN groups of copper(I) cyanide complex ion are not thoroughly decomposed. Preferably, the treatment temperature is higher than 220° C. in order to assure the complete decomposition of the CN groups. Usually the process of the invention is carried out in a high pressure reactor made of plain carbon steel, stainless steel, etc. and the treatment temperature is preferably not higher than 300° C. in view of the strength of the reactor. The liquid may be heated by a heater immersed therein or by heating the reactor from the outside. Also, the liquid may be heated by injecting high-pressure steam therein. The use of such steam singly or in combination with some other heating means is advantageous in effecting uniform treatment since the liquid can then be agitated by the blow of steam.

During the treatment, ammonia is generated and preferably occasionally removed from the reactor through an exhaust vent attached to the reactor in order to accelerate the decomposition of the copper(I) cyanide complex ion.

As stated above, the process of the invention uses no heavy metals but the water-soluble metal hydroxide. Therefore, the amount of sludges formed in the treated liquid is not as great as in the prior processes.

The present invention will be explained further in detail by the following Examples.

EXAMPLES 1 TO 6 AND COMPARATIVE EXAMPLES 1 AND 2

To a 6 liter autoclave made of stainless steel, an aqueous cyanic liquid (4 liters) containing total CN concentration of 5,500 ppm (measured according to the procedure as described in JIS (Japanese Industrial Standard) K 0102 (1971), 29.1.2 and 29.2), 4,000 ppm of which was assigned to the CN groups of tricyanocopper(I) complex ion (determined by dissolving a sample of the liquid into a mixture of nitric acid and sulfuric acid, evaporating the resulting solution to dryness, dissolving the residue into water, measuring quantitatively the copper content by atomic absorption spectrochemical analysis, calculating the amount of tricyanocopper ion ($Cu(CN)_3^{--}$) from the measured amount and calculating the CN concentration on the basis of the amount of ($Cu(CN)_3^{--}$)), was charged, and an aqueous solution of the water-soluble metal hydroxide as shown in Table 1 was added thereto. The resultant mixture was heated under the predetermined conditions as shown in Table 1. The results are shown in Table 1.

TABLE 1

|  | Metal hydroxide (ppm) | | Temp. (°C.) | Time (hr) | CN concentration after treatment (ppm) | CN decomposition (%) |
| --- | --- | --- | --- | --- | --- | --- |
|  | NaOH | KOH |  |  |  |  |
| Example 1 | 3000 | — | 200 | 6 | 480 | 91.3 |
| Example 2 | 3000 | — | 210 | 6 | 120 | 97.8 |
| Example 3 | 3000 | — | 220 | 6 | 6.4 | 99.9 |
| Example 4 | 550 | — | 230 | 6 | 360 | 93.5 |
| Example 5 | 3000 | — | 230 | 6 | 0.10 | 99.99 |
| Example 6 | — | 4200 | 230 | 6 | 0.06 | 99.99 |
| Comparative Example 1 | — | — | 220 | 6 | 1920 | 65.1 |
| Comparative Example 2 | 3000 | — | 180 | 6 | 1800 | 67.3 |

As is clear from the results shown in Table 1, the decomposition rate in Examples 1 to 6 (according to the invention) is higher than 90%. Also, in the treated liquid, only the cuprous oxide sludge was formed and no other superfluous sludge was substantially formed.

What is claimed is:

1. A process for treating a cyanic liquid containing copper(I) cyanide complex ion which comprises heating the liquid at a temperature of not lower than 200° C. in the presence of a water-soluble metal hydroxide.

2. The process according to claim 1, wherein the amount of the water-soluble metal hydroxide is at least 0.2 mole to 1 mole of the copper(I) cyanide complex ion.

3. The process according to claim 2, wherein the amount of the water-soluble metal hydroxide is at least 1 mole to 1 mole of the copper(I) cyanide complex ion.

4. The process according to claim 1, wherein the heating is carried out at a temperature of from 220° C. to 300° C.

5. The process according to claim 1, wherein the water-soluble metal hydroxide is at least one selected from the group consisting of lithium hydroxide, sodium hydroxide, potassium hydroxide, calcium hydroxide, barium hydroxide and strontium hydroxide.

6. The process according to claim 5, wherein the water-soluble metal hydroxide is sodium hydroxide or potassium hydroxide.

7. The process according to claim 1, wherein the content of a CN concentration in the liquid is from several ppm to 100,000 ppm.

8. The process according to claim 1, wherein the cyanic liquid is heated in a reactor by injecting high-pressure steam therein.

9. The process according to claim 1, wherein ammonia generated by the process is periodically removed.

* * * * *